G. KNEUER.
Refrigerators.

No. 151,033.   Patented May 19, 1874.

UNITED STATES PATENT OFFICE.

GEORG KNEUER, OF BROOKLYN, NEW YORK.

IMPROVEMENT IN REFRIGERATORS.

Specification forming part of Letters Patent No. 151,033, dated May 19, 1874; application filed May 2, 1874.

*To all whom it may concern:*

Be it known that I, GEORG KNEUER, of Brooklyn, in the county of Kings and State of New York, have invented an Improvement in Refrigerators; and the following is declared to be a correct description of the same.

Refrigerators and ice-chambers have been made with the receptacle for the ice in the upper part, and with pipes passing down from such receptacle, into which pipes the water runs as the ice melts; and there has been an overflow-pipe, through which such water is finally discharged.

My invention is made for bringing the atmosphere into contact with the escaping water, and compelling a circulation of the atmosphere within the refrigerator. I make use of coils of pipe placed at the inner sides of the refrigerator, through which the water from the melting ice trickles; and these pipes are perforated upon their upper sides, so that a circulation of atmosphere is insured through those pipes downwardly in the same direction as the atmosphere outside the pipes; thereby the atmosphere and water move in the same direction within the pipes, and the water and atmosphere pass out from the lower ends or openings, the atmosphere circulating within the refrigerator, and the water being received by a suitable vessel.

Figure 1:
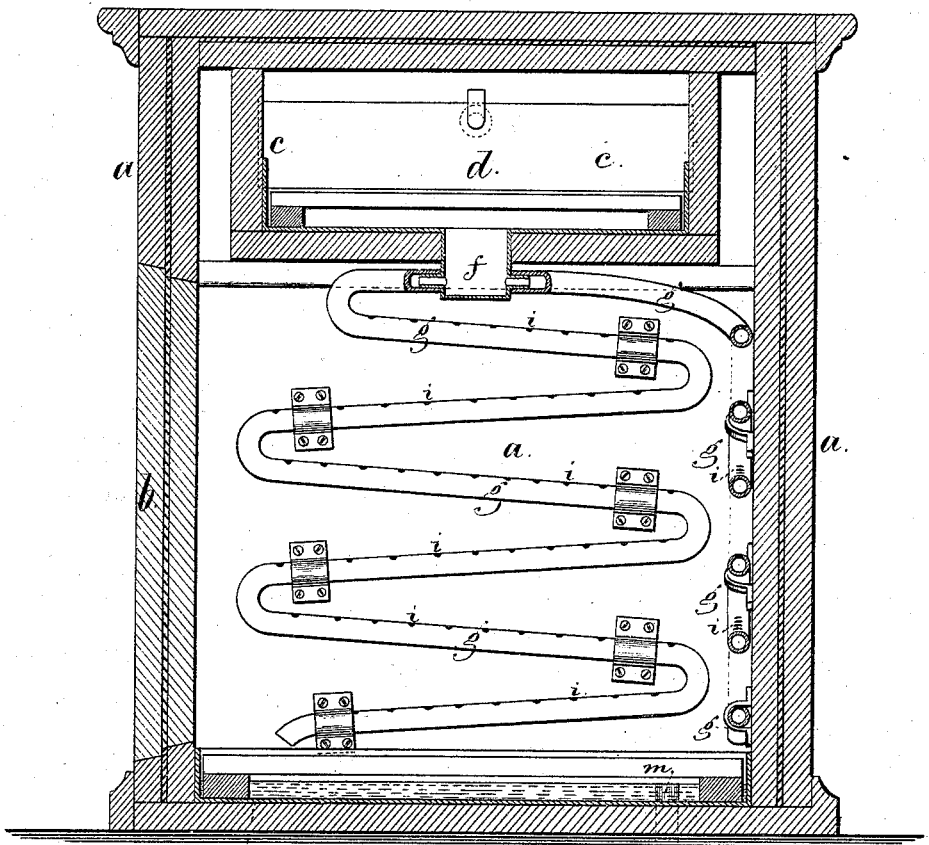
Figure 2:
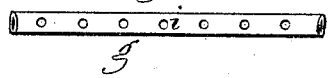
Figure 2:

In the drawing, Figure 1 is a vertical section of my improved refrigerator, and Fig. 2 is a plan of part of one of the pipes.

The walls $a\,a$ and door $b$ are preferably made of two thicknesses of wood, with an intervening layer of felt or paper. The ice box or receptacle $c$ is of suitable size, and provided with the door $d$ at one end, to allow for the insertion of ice. At the bottom of the ice-receptacle $c$ there are slats to support the ice, and the water runs from the melting ice into the box $f$, from which the pipes $g$ pass, and continue as zigzags or vertical coils at the sides of the refrigerator, and terminate near the bottom with open ends. The upper surfaces of these coil-pipes are perforated, as at $i\,i$, so that air can circulate downwardly through these holes, and pass out from the lower ends of the pipes, so that the atmosphere is cooled both by the temperature of the pipe and by direct contact with the water trickling through such pipes. The pan $l$ in the bottom of the refrigerator receives the water, and an overflow, $m$, conveys away the surplus; thereby the refrigerator is cooled by the water, and the water passes away at about the same temperature as the atmosphere of the chamber.

I claim as my invention—

The vertical ranges or coils of pipe within the chamber to be cooled, and provided with holes in the upper surfaces of said pipes, for the circulating currents of air, said pipes being connected to the ice-box, so that the water from the ice runs through such pipes, as set forth.

Signed by me this 29th day of April, A. D. 1874.

GEORG KNEUER.

Witnesses:
GEO. T. PINCKNEY,
CHAS. H. SMITH.